United States Patent
Shino

(10) Patent No.: US 11,606,471 B2
(45) Date of Patent: Mar. 14, 2023

(54) IMAGE PROCESSING APPARATUS THAT PERFORMS FUNCTION IN ACTION PATTERN CORRESPONDING TO CHANGEABLE USER'S REQUEST, CONTROL METHOD THEREFOR, AND STORAGE MEDIUM STORING CONTROL

(71) Applicant: CANON KABUSHIKI KAISHA, Tokyo (JP)

(72) Inventor: Ikuko Shino, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/337,533

(22) Filed: Jun. 3, 2021

(65) Prior Publication Data
US 2021/0289088 A1    Sep. 16, 2021

Related U.S. Application Data

(63) Continuation of application No. 16/192,980, filed on Nov. 16, 2018, now Pat. No. 11,050,894.

(30) Foreign Application Priority Data

Nov. 20, 2017 (JP) .............................. JP2017-222894

(51) Int. Cl.
*H04N 1/00* (2006.01)
(52) U.S. Cl.
CPC ..... *H04N 1/00514* (2013.01); *H04N 1/00389* (2013.01); *H04N 1/00472* (2013.01); *H04N 1/00474* (2013.01)
(58) Field of Classification Search
CPC ... G06F 3/1201; G06F 3/1204; H04N 1/0035; H04N 1/00384; H04N 1/00389; H04N 1/00474
(Continued)

(56) References Cited

U.S. PATENT DOCUMENTS

2010/0287490 A1   11/2010   Ichimi
2012/0257244 A1*   10/2012   Hara ................... H04N 1/00411
                                                                         358/1.14

(Continued)

FOREIGN PATENT DOCUMENTS

JP       2010154039 A    7/2010

OTHER PUBLICATIONS

Office Action issued in U.S. Appl. No. 16/192,980 dated Jun. 27, 2019.

(Continued)

*Primary Examiner* — Kent Yip
(74) *Attorney, Agent, or Firm* — Rossi, Kimms & McDowell LLP

(57) ABSTRACT

An image processing apparatus that is capable of a simple operation and is capable of executing a function in an action pattern corresponding to a changeable user's request. A registration unit registers a function in association with an action pattern. A selection unit designates a function registered by the registration unit and to select one of a first mode and a second mode. A controller controls so as to execute a function designated by the selection unit according to the action pattern registered in association with the designated function when the selection unit selects the first mode, and to execute a function designated by the selection unit according to an action pattern designated by a user irrespective of the action pattern registered in association with the designated function when the selection unit selects the second mode.

6 Claims, 16 Drawing Sheets

(58) Field of Classification Search
USPC .......................................................... 358/1.15
See application file for complete search history.

(56) References Cited

U.S. PATENT DOCUMENTS

| | | |
|---|---|---|
| 2013/0077119 A1 | 3/2013 | Arai |
| 2015/0046879 A1 | 2/2015 | Orimoto |
| 2015/0172487 A1 | 6/2015 | Kirihara |
| 2017/0085731 A1 | 3/2017 | Akuzawa |
| 2017/0331964 A1 | 11/2017 | O |
| 2018/0288250 A1 | 10/2018 | Hattori |
| 2018/0373470 A1 | 12/2018 | Hayashi |

OTHER PUBLICATIONS

Office Action issued in U.S. Appl. No. 16/192,980 dated Dec. 30, 2019.
Office Action issued in U.S. Appl. No. 16/192,980 dated Apr. 16, 2020.
Office Action issued in U.S. Appl. No. 16/192,980 dated Oct. 14, 2020.
Notice of Allowance issued in U.S. Appl. No. 16/192,980 dated Mar. 4, 2021.

* cited by examiner

<Setting Confirmation>
These contents are registered, aren't they?

| Color Mode | ▶ | Black |
| Type of Original | ▶ | Character/Photo/Others |
| Two-Sided Original | ▶ | Not Set |

Cancel — 801

Next — 802

<Register as Portal Button: Setting When Calling>

901  902

Setting Confirmation Display
Function at Press of Button     ON    OFF

Immediate Execution Function
at Press of Button              ON    OFF
("ON" inputs a job at the same time
of press of a button.)          903   904

Cancel    Back    Next
          905     906

FIG. 12

| PORTAL BUTTON No. | APPLICATION ID | ACTION ID | ICON INFORMATION | BUTTON INFORMATION (NAME/COMMENT) |
|---|---|---|---|---|
| 1 | 102 | 1 | fax.bmp | SEND LICENSE AGREEMENT/ |
| 2 | 101 | 1 | box.bmp | STORE LICENSE AGREEMENT/MANAGEMENT DEPARTMENT DB |
| 3 | 100 | 1 | copy.bmp | LUNCH MEETING/DELIVERY MATERIAL |
| 4 | 101 | 2 | box.bmp | LICENSE AGREEMENT/FOR PRIVATE-STORAGE |
| 5 | 100 | 2 | copy.bmp | MEETING/DELIVERY MATERIAL |
| 6 | 100 | 3 | copy.bmp | PRIVATE/MATERIAL |

FIG. 13

| PORTAL BUTTON No. | APPLICATION ID | ACTION ID | ICON INFORMATION | BUTTON INFORMATION (NAME/COMMENT) |
|---|---|---|---|---|
| 1 | 102 | 1 | fax.bmp | SEND LICENSE AGREEMENT/ |
| 2 | 101 | 1 | box.bmp | STORE LICENSE AGREEMENT/MANAGEMENT DEPARTMENT DB |
| 3 | 100 | 1 | copy.bmp | LUNCH MEETING/DELIVERY MATERIAL |
| 4 | 101 | 2 | box.bmp | LICENSE AGREEMENT/FOR PRIVATE-STORAGE |
| 5 | 100 | 2 | copy.bmp | MEETING/DELIVERY MATERIAL |

FIG. 14

| ACTION ID | ICON INFORMATION | SETTING INFORMATION | ACTION INFORMATION |
|---|---|---|---|
| 1 | copy.bmp | NUMBER OF SHEETS: 10, DENSITY+3 2-SIDED: 2-SIDED TO 1-SIDED | SETTING CONFIRMATION: ON, IMMEDIATE EXECUTION: ON |
| 2 | copy.bmp | NUMBER OF SHEETS: 5, COLOR: AUTO, FINISHING: STAPLE | SETTING CONFIRMATION: OFF, IMMEDIATE EXECUTION: OFF |
| 3 | copy.bmp | NUMBER OF SHEETS: 1, COLOR: BLACK | SETTING CONFIRMATION: OFF, IMMEDIATE EXECUTION: ON |

FIG. 20A

| PORTAL BUTTON No. | APPLICATION ID | ACTION ID | ICON INFORMATION | BUTTON INFORMATION (NAME/COMMENT) | ACTION INFORMATION |
|---|---|---|---|---|---|
| BLANK | BLANK | BLANK | BLANK | BLANK | BLANK |

FIG. 20B

| PORTAL BUTTON No. | APPLICATION ID | ACTION ID | ICON INFORMATION | BUTTON INFORMATION (NAME/COMMENT) | ACTION INFORMATION |
|---|---|---|---|---|---|
| 6 | 100 | 3 | copy.bmp | PRIVATE/ MATERIAL | SETTING CONFIRMATION: OFF, IMMEDIATE EXECUTION: ON |

FIG. 20C

| PORTAL BUTTON No. | APPLICATION ID | ACTION ID | ICON INFORMATION | BUTTON INFORMATION (NAME/COMMENT) | ACTION INFORMATION |
|---|---|---|---|---|---|
| 6 | 100 | 3 | copy.bmp | PRIVATE/ MATERIAL | SETTING CONFIRMATION: ON, IMMEDIATE EXECUTION: ON |

IMAGE PROCESSING APPARATUS THAT PERFORMS FUNCTION IN ACTION PATTERN CORRESPONDING TO CHANGEABLE USER'S REQUEST, CONTROL METHOD THEREFOR, AND STORAGE MEDIUM STORING CONTROL

BACKGROUND OF THE INVENTION

Field of the Invention

The present invention relates to an image processing apparatus that is able to execute functions, such as a copy and facsimile, a control method therefor, and a storage medium storing a control program therefor.

Description of the Related Art

An image processing apparatus like an MFP (Multi-Function Peripheral) is becoming to provide new functions, such as a network copy and network print, by cooperating with other apparatuses in addition to functions of a stand-alone apparatus in recent years. Accordingly, kinds and complexity of functions are increasing. A careful description about a setting procedure is required so that a user who is unfamiliar to functions is able to understand the various functions. For example, there is a known MFP that allocates a specific application to a soft button displayed on a soft-button list screen and registers setting values (for example, a sheet size and a color mode) that are unique to the application concerned. There is a known technique that registers an action pattern of such an MFP corresponding to the soft button in advance when the setting values are registered (Japanese Laid-Open Patent Publication (Kokai) No. 2010-154039 (JP 2010-154039A)). The action pattern defines whether a confirmation message about the setting values will be displayed before executing the application in response to an operation of the soft button and defines whether the application is immediately executed.

The technique of the above-mentioned publication has no problem when a request for the action pattern does not vary. However, the request for the action pattern actually varies in a process through which a user uses the function. For example, a user who needed to confirm the setting values at first may not need the confirmation because of habituation due to repeated use. In the meantime, a user who uses without confirmation may need to confirm the setting values again when using after a long time. The technique of the above-mentioned publication requires the user to re-register the application when changing the action pattern corresponding to the application. However, it is difficult for a user to think that re-registration of the application is needed to change the action pattern. Moreover, a change operation of the action pattern is complicated and operability is not good. Incidentally, the above-mentioned publication suggests a technique by which the action pattern of the MFP is decided depending on the operation pattern (press period) of the soft button by a user. However, such a technique may induce an operation error because it is difficult to inform the user of the relation between the operation pattern and the action pattern. Accordingly, there is a problem that it is difficult to cope with both securing of a simple operation to a user familiar to operation of a function and securing of an operation for executing a function carefully.

SUMMARY OF THE INVENTION

The present invention provides an image processing apparatus, a control method therefor, and a storage medium storing a control program therefor, which are capable of a simple operation and are capable of executing a function in an action pattern corresponding to a changeable user's request.

Accordingly, a first aspect of the present invention provides an image processing apparatus comprising a registration unit configured to register a function in association with an action pattern, a selection unit configured to designate a function registered by the registration unit and to select one of a first mode and a second mode, and a controller configured to control so as to execute a function designated by the selection unit according to the action pattern registered in association with the designated function when the selection unit selects the first mode, and to execute a function designated by the selection unit according to an action pattern designated by a user irrespective of the action pattern registered in association with the designated function when the selection unit selects the second mode.

Accordingly, a second aspect of the present invention provides a control method for an image processing apparatus, the control method comprising a registration step of registering a function in association with an action pattern; a selection step of designating a function registered in the registration step and of selecting one of a first mode and a second mode, and a control step of controlling so as to execute a function designated in the selection step according to the action pattern registered in association with the designated function when the first mode is selected in the selection step, and to execute a function designated in the selection step according to an action pattern designated by a user irrespective of the action pattern registered in association with the designated function when the second mode is selected in the selection step.

Accordingly, a third aspect of the present invention provides a non-transitory computer-readable storage medium storing a control program causing a computer to execute the control method of the second aspect.

According to the present invention, a simple operation is allowed and a function is able to be executed in an action pattern corresponding to a changeable user's request.

Further features of the present invention will become apparent from the following description of exemplary embodiments with reference to the attached drawings.

BRIEF DESCRIPTION OF THE DRAWINGS

FIG. 8 is a view showing an example of a setting confirmation screen displayed in relation to the portal button registration process in FIG. 5.

FIG. 9 is a view showing an example of an action setting screen displayed in relation to the portal button registration process in FIG. 5.

FIG. 12 is a view showing table information registered in the portal button registration process in FIG. 5.

FIG. 13 is a view showing other table information registered in the portal button registration process in FIG. 5.

FIG. 14 is a view showing a set-information table saved in a storage area of a copy application in FIG. 2.

FIG. 20A, FIG. 20B, and FIG. 20C are views showing examples of a temporary button information table used by the image processing apparatus according to the second embodiment.

DESCRIPTION OF THE EMBODIMENTS

Hereafter, embodiments according to the present invention will be described in detail with reference to the drawings.

Figure 1:
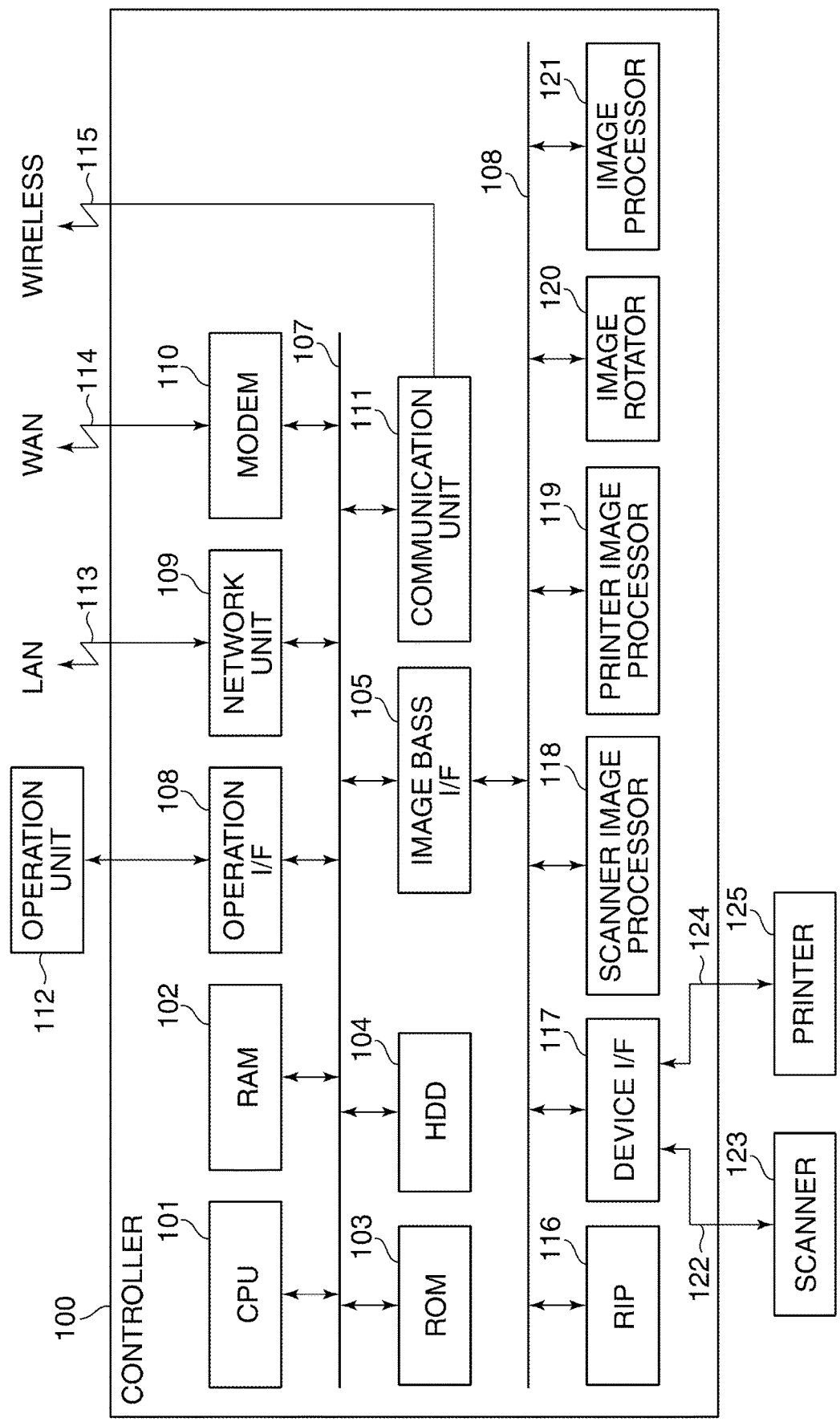
FIG. 1 is a block diagram schematically showing an example of an inner configuration of an image processing apparatus according to a first embodiment of the present invention.

FIG. 1 is a block diagram schematically showing an example of an inner configuration of an image processing apparatus according to a first embodiment of the present invention. The image processing apparatus is provided with a controller 100 that controls various sections in the apparatus, an operation unit 112, a scanner 123, and a printer 125 as a fundamental configuration. The operation unit 112 consists of a liquid crystal touch panel (not shown) and hard keys, such as a ten-digit keypad for inputting a number and a start key for instructing execution of a process, for example, and provides a user interface for a user to operate the image processing apparatus. A user is able to enter settings and information to the image processing apparatus by touching (pressing) icons and buttons (or hard keys) displayed on the touch panel (a display device) of the operation unit 112 to indicate setting items.

The scanner 123 reads an image of an original etc. as image data. The printer 125 conveys a recording sheet and prints the image data as a visible image onto the recording sheet. The controller 100 is connected to the scanner 123 via a bus 122 and is connected to the printer 125 via a bus 124. The controller 100 connects to other devices through a wired LAN 113, a public telephone line (WAN) 114, and a wireless LAN 115, and controls input/output of image information and device information. A CPU 101 is a controller that controls the whole system. A RAM 102 is a system work memory for a work of the CPU 101, and is also an image memory for storing image data temporarily. A ROM 103 is a boot ROM. A boot program for the system is stored in the ROM 103. A hard disk drive (HDD) 104 stores system software, image data, and information (specification of wireless communications) about all wireless communications that a communication unit 111 mentioned later has.

The image processing apparatus is able to add a function by installing an application that implements the function to use. Application programs for performing various functions on the image processing apparatus are stored in the RAM 102 or the HDD 104 by installing applications. An operation I/F 106 is an interface with the operation unit 112 that is a user interface (UI), and outputs data that should be displayed on the operation unit 112 to the operation unit 112. The operation I/F 106 transfers information entered by a user through the operation unit 112 to the CPU 101. A network unit 109 is connected to the wired LAN 113, and inputs and outputs information. A modem 110 is connected to the public telephone line 114, and inputs and outputs information. The communication unit 111 is connected to a wireless LAN 115 through an antenna (not shown), and inputs and outputs information. Moreover, the communication unit 111 is able to perform a plurality of kinds of wireless communications. The above-mentioned devices are arranged on a system bus 107.

An image bus I/F 105 is a bus bridge that connects the system bus 107 with an image bus 108 that transmits image data at high speed, and that converts a data structure. The image bus 108 is a bus that is defined by the PCI bus or IEEE1394. A raster image processor (RIP) 116 among the devices arranged on the image bus 108 develops a PDL code to a bitmap image. A device I/F 117 connects the scanner 123 or the printer 125 to the controller 100, and converts image data between a synchronizing system and an asynchronous system. A scanner image processor 118 corrects, processes, and edits input image data. A printer image processor 119 corrects print-out image data and converts a resolution of the image data so as to be suitable for the printer 125. An image rotator 120 rotates the image data. An image processor 121 applies an image compression/extension process, such as JPEG, JBIG, MMR, and MH, and a format conversion process, such as PDF, TIFF, OCR, and encryption to the image data.

Figure 2:
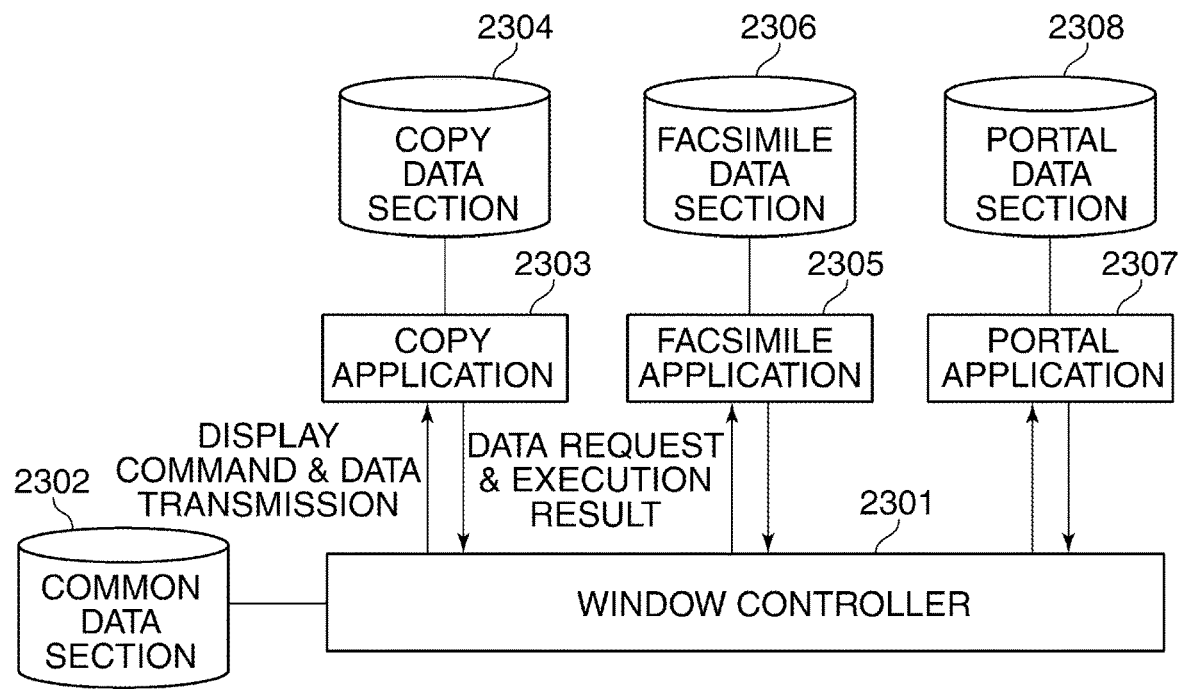
FIG. 2 is a view showing configurations of data and software that are used for displaying functions and setting values of applications installed in the image processing apparatus in FIG. 1.

Next, a software configuration for displaying a function and setting value of an application installed in the image processing apparatus on the operation unit 112 will be described with reference to FIG. 2. FIG. 2 is a view showing configurations of data and software for displaying the function and setting value of the application on the operation unit 112.

There are a copy application 2303 that has a function about a copy action and a facsimile application 2305 that has a function about a facsimile action that sends and receives document data as applications installed in the image processing apparatus. Furthermore, there is a portal application 2307 that has a function about a portal. These applications are directly installed in the image processing apparatus by a user. However, they may be installed in the image processing apparatus via the network unit 109, the communication unit 111, etc. The installed applications are stored in the RAM 102 or the HDD 104 as application programs.

Moreover, the installed applications run independently by commands of the CPU 101. Accordingly, data used by the applications are grouped for the respective applications and are stored in the HDD 104. It should be noted that data shared between the applications are stored as common data in a common data section 2302 set up in the HDD 104. Moreover, application IDs are allocated as identifiers to the installed applications for identifying the applications. The application IDs are stored as common data in the common data section 2302. In the first embodiment, an application ID "100" is allocated to the copy application 2303, an application ID "101" is allocated to the facsimile application 2305, and an application ID "102" is allocated to the portal application 2307.

The function of the window controller 2301 is achieved by collaboration of the CPU 101, the RAM 102, the ROM 103, etc. A window controller 2301 selects an application of which a screen is displayed on the operation unit 112 from among the applications installed in the image processing apparatus. Each of the applications like the copy application 2303 installed in the image processing apparatus obtains data, such as a screen resource and a setting value, from the HDD 104 in response to a command from the window controller 2301 and displays a screen. When receiving a display request of the copy application 2303 (application ID "100"), the window controller 2301 determines whether the display by the function of the copy application 2303 is available. When the display is available, the window controller 230 notifies the copy application 2303 of a display command. It should be noted that possible setting data used for displaying are sent with the display command. When receiving the display command, the copy application 2303 obtains a screen resource and a setting value from a copy data section 2304 set up in the HDD 104 and displays a screen on the operation unit 112. In the meantime, when displaying data that is not stored in the copy data section 2304, the copy application 2303 notifies the window controller 2301 of a data request. When receiving the data request, the window controller 2301 obtains corresponding data from the common data section 2302 set up in the HDD 104 and sends the data to the copy application 2303. Then, the copy application 2303 displays the data.

The facsimile application 2305 enables transmission and reception of data about the facsimile with a facsimile data section 2306 set up in the HDD 104. In the same manner, the portal application 2307 enables transmission and reception of data about the portal with a portal data sections 2308 set up in the HDD 104. Although the image processing apparatus is provided with three kinds of applications including the copy application, facsimile application, and portal application in the first embodiment, the image processing apparatus may be provided with other applications, such as a scan application.

Figure 3:
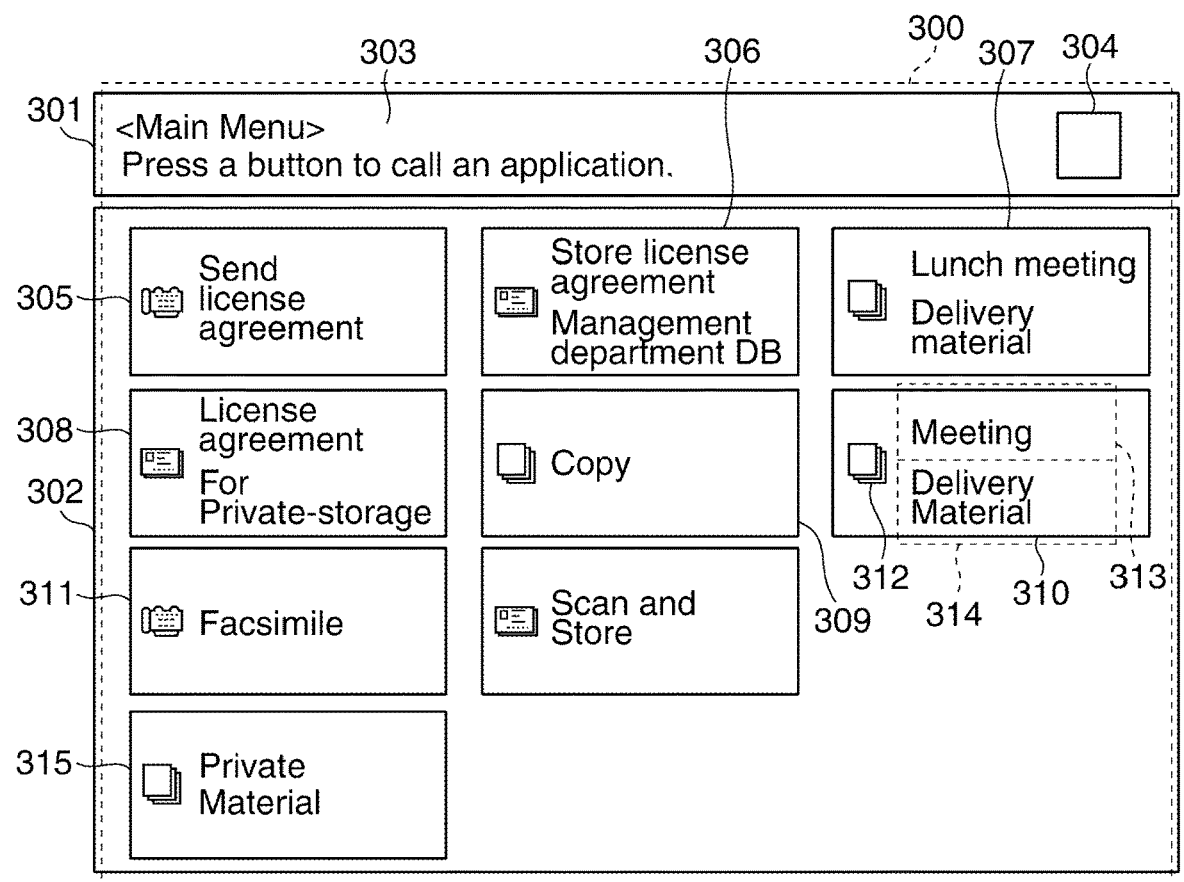
FIG. 3 is a view showing an example of a top screen displayed on a touch panel of an operation unit of the image processing apparatus in FIG. 1.
Figure 4:
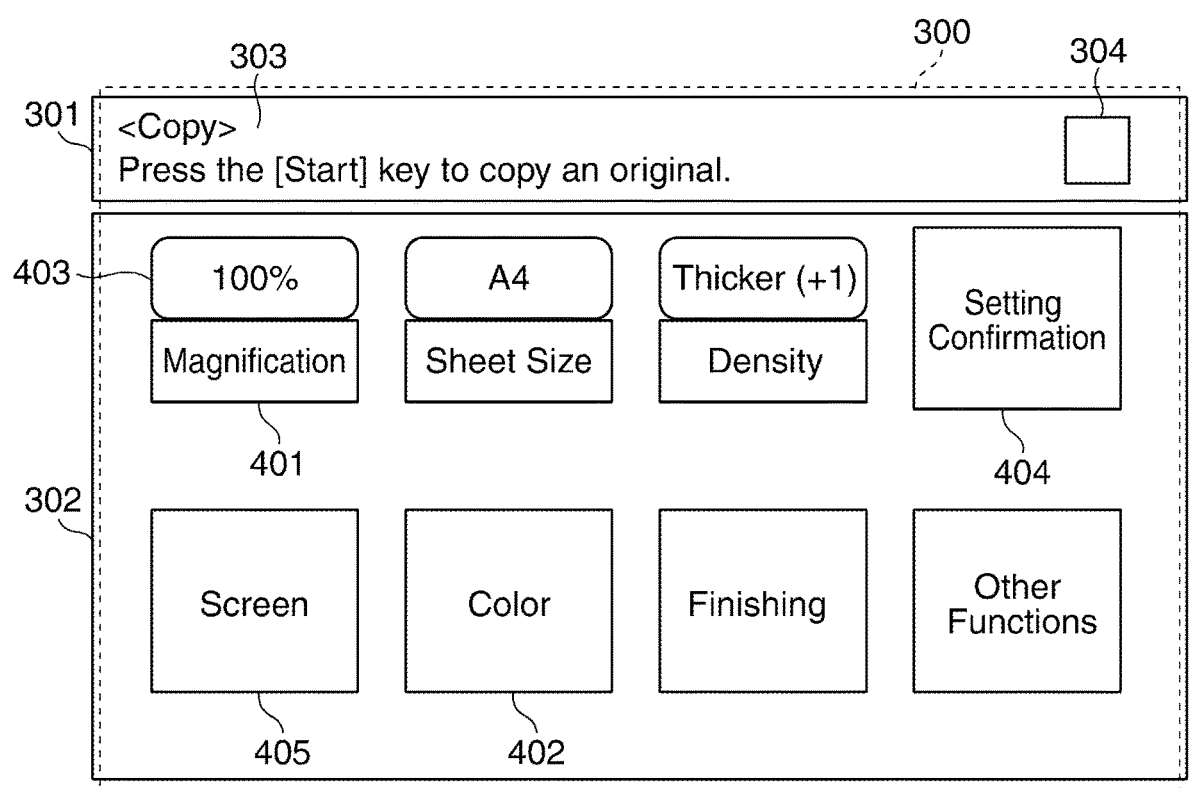
FIG. 4 is a view showing an example of a copy initial screen displayed on the touch panel of the operation unit of the image processing apparatus in FIG. 1.

FIG. 3 and FIG. 4 are views showing examples of screens displayed on the touch panel of the operation unit 112. When the power of the image processing apparatus is turned ON and is in a ready condition, a top (Main Menu) screen 300 shown in FIG. 3 is displayed on a display area of the touch panel of the operation unit 112 at the beginning. The top screen 300 consists of a common area 301 where contents common among screens are displayed and a function area 302 where contents that are screen specific are displayed.

The common area 301 has a title bar 303 for describing a screen currently displayed, a menu button 304 for displaying a menu for setting registration and function setting corresponding to the screen currently displayed.

Application buttons for switching from the top screen to screens that use the applications, such as the copy application and the facsimile application, are displayed in the functional area 302. In the first embodiment, a copy application button 309, a facsimile application button 311, and portal buttons 305, 306, 307, 308, 310, and 315 are displayed as the application buttons. When a new application is installed in the image processing apparatus, an application button corresponding to the new application is displayed in the functional area 302 on the top screen 300.

Figure 7:
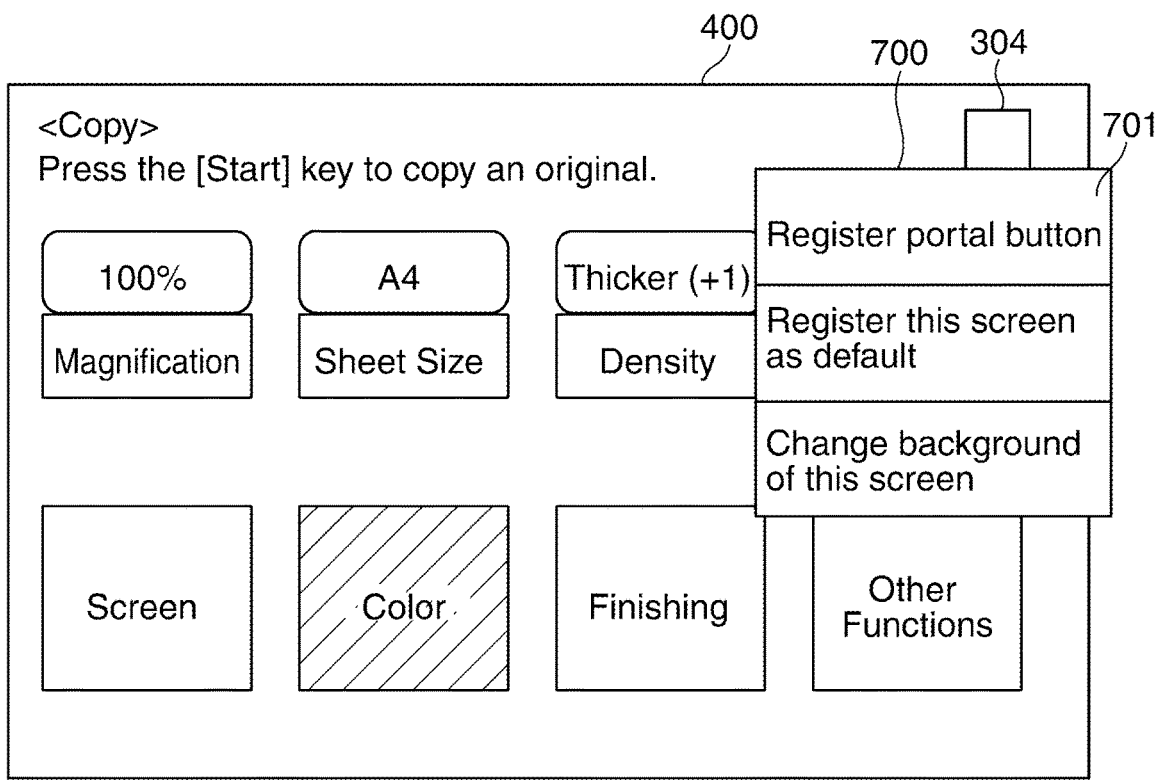
FIG. 7 is a view showing an example where a menu list is displayed over the copy initial screen in FIG. 4.
Figure 10:
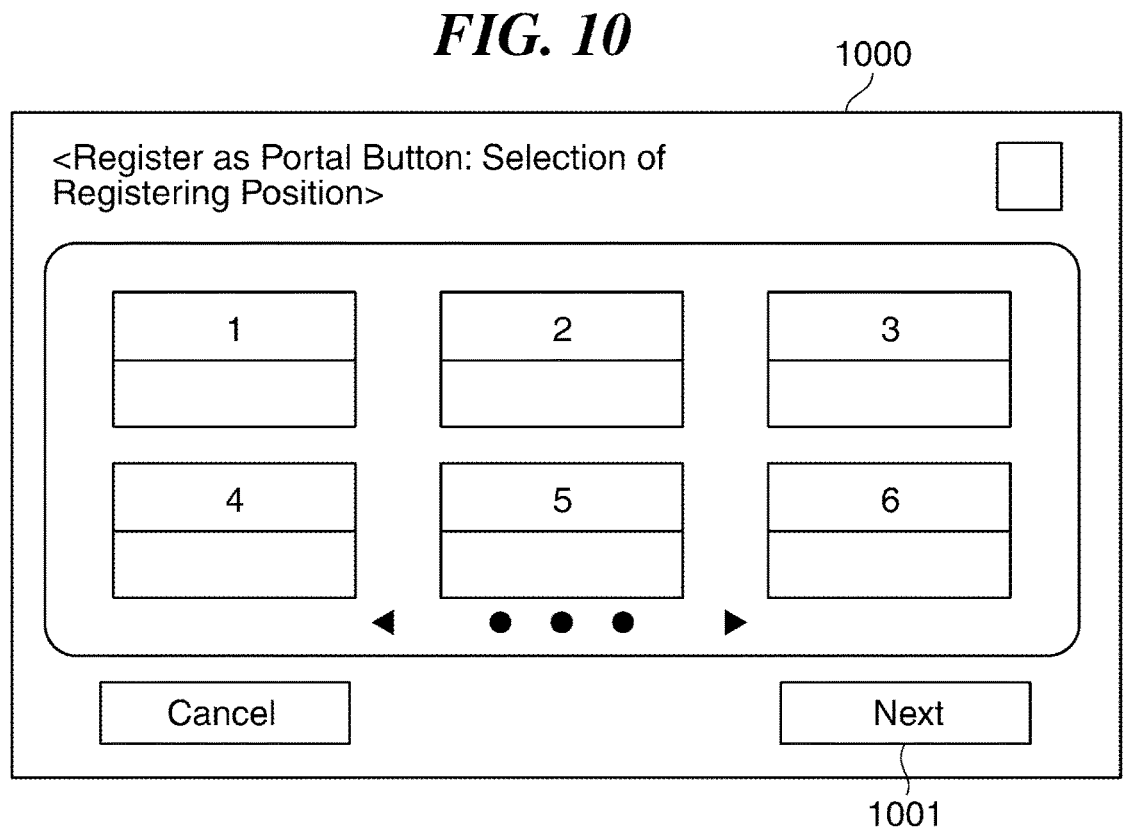
FIG. 10 is a view showing an example of a button display setting screen displayed in relation to the portal button registration process in FIG. 5.
Figure 11:
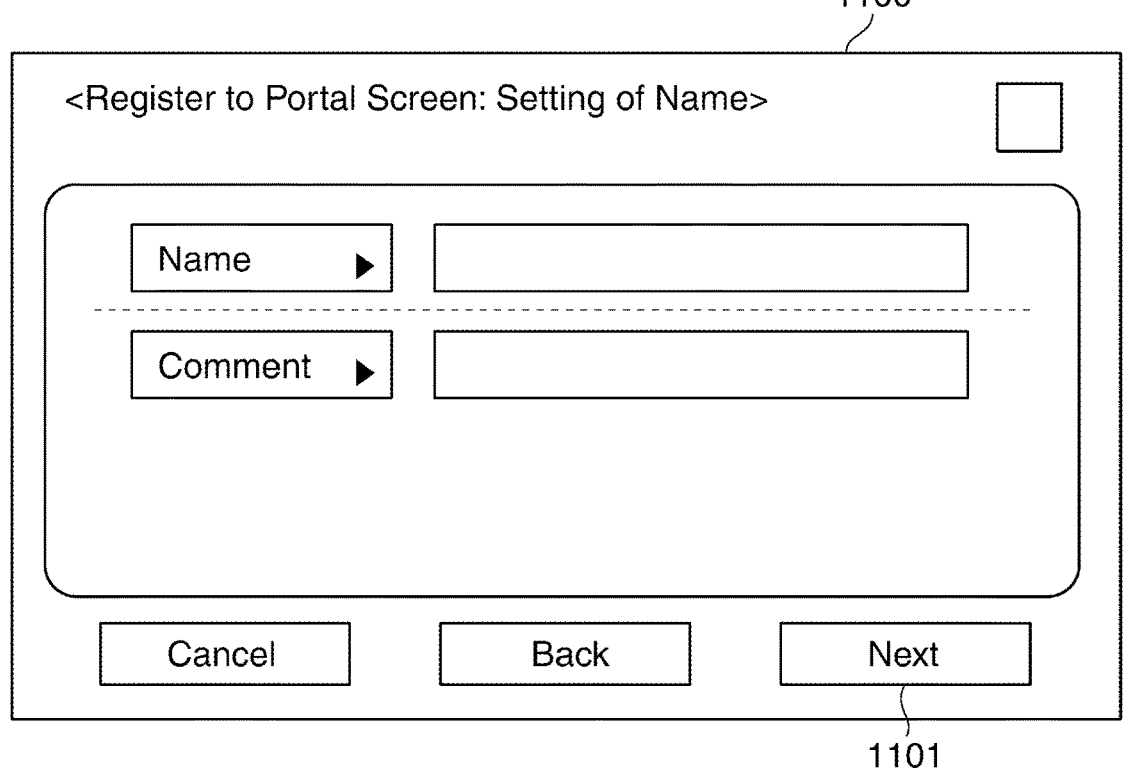
FIG. 11 is a view showing an example of another button display setting screen displayed in relation to the portal button registration process in FIG. 5.

The menu button 304 is a button for displaying for displaying a menu for setting registration and function setting corresponding to each screen. When the menu button 304 is pressed, a menu list 700 shown in FIG. 7 mentioned later is displayed. Each application defines contents displayed in the menu list 700 and internal processes corresponding to selected contents for every screen. The defined contents are stored in the HDD 104 in association with each screen. When there is no content that should be displayed on the menu list 700, the menu button 304 is displayed with shading and cannot be selected by a user. In the first embodiment, the applications other than the portal application certainly define a registration area 701 with a message of "Register portal button" in the menu list 700 as shown in FIG. 7 and the corresponding process.

A user is able to perform various settings on the operation unit 112. For example, the user can perform input of the number of copies, display of an error status of an image formation state, bookbinding printing setting that consists of combination of a plurality of setting operations, etc. Hereinafter, such various settings are called "the various settings about image formation" generically. The portal application 2307 has a function (hereinafter referred to as a "call reappearance function") that saves the various settings about image formation as setting information and calls and reappears the saved setting information in response to a user's request. The portal application 2307 also has a change-deletion function for changing or deleting the saved various settings. Details thereof will be described below.

In the first embodiment, all pieces of the information (a coordinate, a font, an image resource, a default setting value, etc.) that are used when the respective applications display the screens are stored in the RAM 102, ROM 103, or HDD 104. Then, the window controller 2301 determines the information that is displayed in each screen according to the state of the image processing apparatus. The information stored in the HDD 104 (the RAM 102 or the ROM 103 may be used) is displayed on the operation unit 112 through the operation I/F 106.

When the copy application button 309 is pressed on the top screen 300 shown in FIG. 3, a copy initial screen 400 shown in FIG. 4 is displayed. A magnification setting button 401 for setting magnification and a double-sided setting button 405 for setting double-sided copy are displayed as setting buttons in a functional area 302 of the copy initial screen 400. A color setting button 402 and a setting confirmation button 404 for confirming the setting contents set up in the entire copy application are displayed in the functional area 302. When either of these setting buttons is pressed, the screen is switched to a corresponding setting screen for changing settings about copy, and the user is allowed to change the settings. It should be noted that setting contents are displayed together with setting buttons about fundamental functions (magnification etc.) that are often used at the time of copying. For example, when magnification is set up, the set-up result (for example, "100%") is displayed on a magnification setting result area 403.

The portal buttons 305, 306, 307, 308, 310, and 315 on the top screen 300 shown in FIG. 3 are buttons that are selectable by the user for calling the various settings about the image formation saved by the call reappearance function. The portal buttons displayed have the same configuration in the top screen 300. For example, the portal button 310 consists of an icon 312, a button name area 313, and a comment area 314. However, the configurations of the portal buttons may differ to each other.

Next, a flow of control when a portal button is displayed in response to the display command of the top screen 300 will be described. The information for displaying the portal buttons is stored and managed as table information as shown in FIG. 13. Button information including an icon, a button name, and a comment is stored in the HDD 104 in association with other information. In the table information shown in FIG. 13, an application ID, an action ID, icon information, and the button information are associated with a portal button number (No.). The icon information includes image data in a bitmap format that can be displayed as an icon or a path to the image data. The button information includes a button name and a comment about this button. The button name is displayed in the button name area 313 and the comment is displayed in the comment area 314 (FIG. 3). It should be noted that the action ID will be described later.

When the CPU 101 detects the display statement of the top screen 300, the window controller 2301 issue a command to the portal application 2307 so as to control the display of the portal buttons. Thereby, the portal application 2307 detects a group that is designated to display from the HDD 104 and detects the portal buttons belonging to the group. Then, the CPU 101 determines an application ID of a normally operatable application. After that, the portal application 2307 reads the button information about the portal buttons corresponding to the application IDs of the normally operatable applications among the detected portal buttons from the HDD 104 and displays these portal buttons according to the read information. Accordingly, the top screen 300 as shown in FIG. 3 including the portal buttons is displayed on the touch panel of the operation unit 112. When a portal button is operated by pressing, the portal application 2307 executes a function registered in association with (corresponding to) the operated portal button. This function (job) corresponds to the registered function in the present invention. Contents displayed when the menu button 304 is operated will be described later.

Next, a process for registering settings about the image formation of each application as a portal button will be described. The process for registering a processing about the image formation of each application as a portal button by the call reappearance function will be described with reference to FIG. 5. Although the copy application is described as an example in the following description, the similar process is applied to another application, such as the facsimile application.

It should be noted that all processes in the first embodiment are executed because the portal application 2307 obtains the information that is saved beforehand in the HDD 104 and an input by a user and issues various execution commands using the CPU 101 on the basis of the information. Moreover, all processes of the copy application 2303 and the portal application 2307 are executed according to determination of the CPU 101. Moreover, when a user touches the touch panel (screen) of the operation unit 112, the CPU 101 detects a coordinate position on the touched screen, and switches the screen or executes a setting process by reading a process program associated with this coordinate position from the HDD 104 and by running it. Moreover, all the results of the processes executed by the commands from the CPU 101 are stored in the RAM 102 or the HDD 104.

Figure 5:
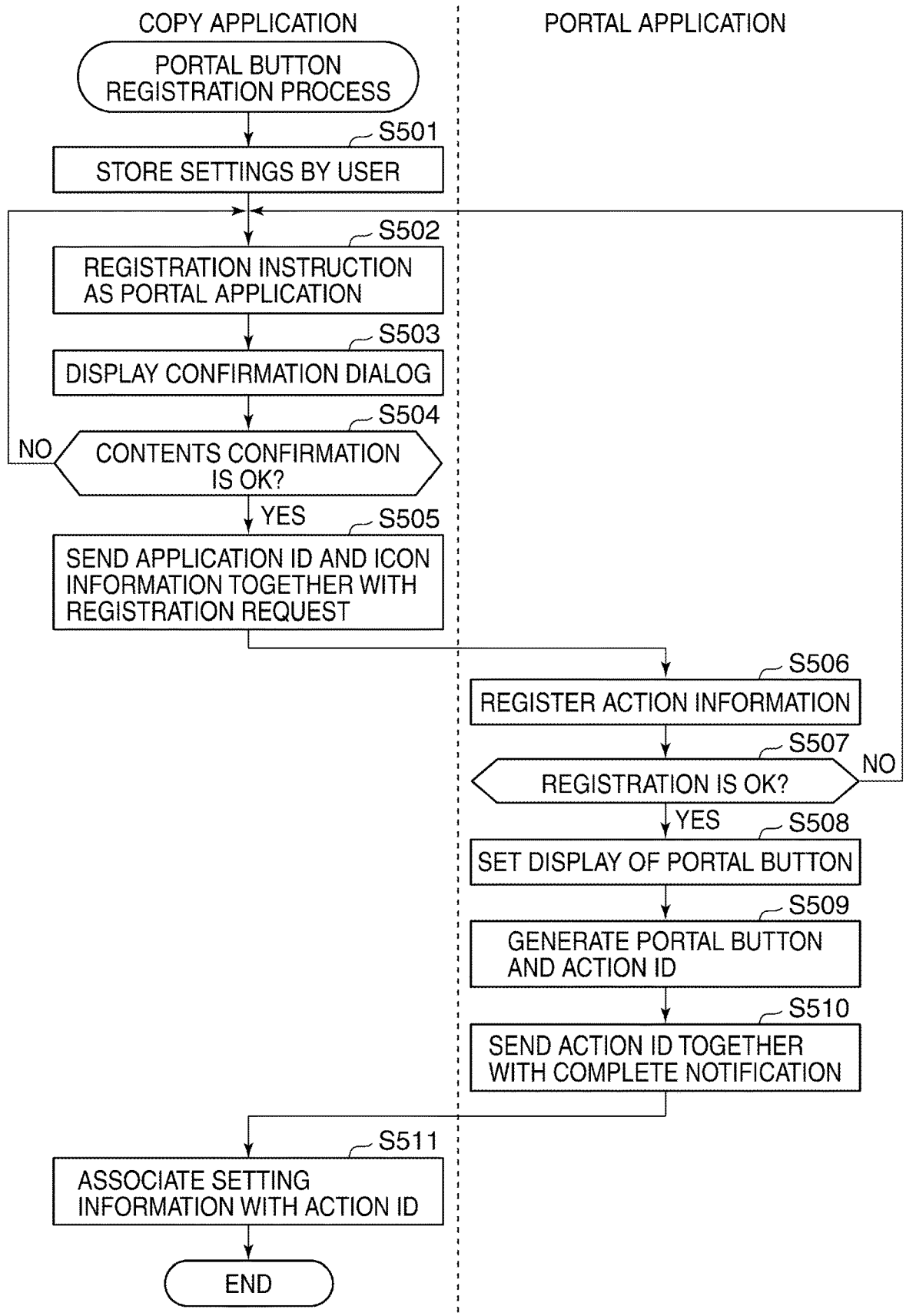
FIG. 5 is a flowchart of an example of a portal button registration process executed by the image processing apparatus in FIG. 1.
Figure 6:
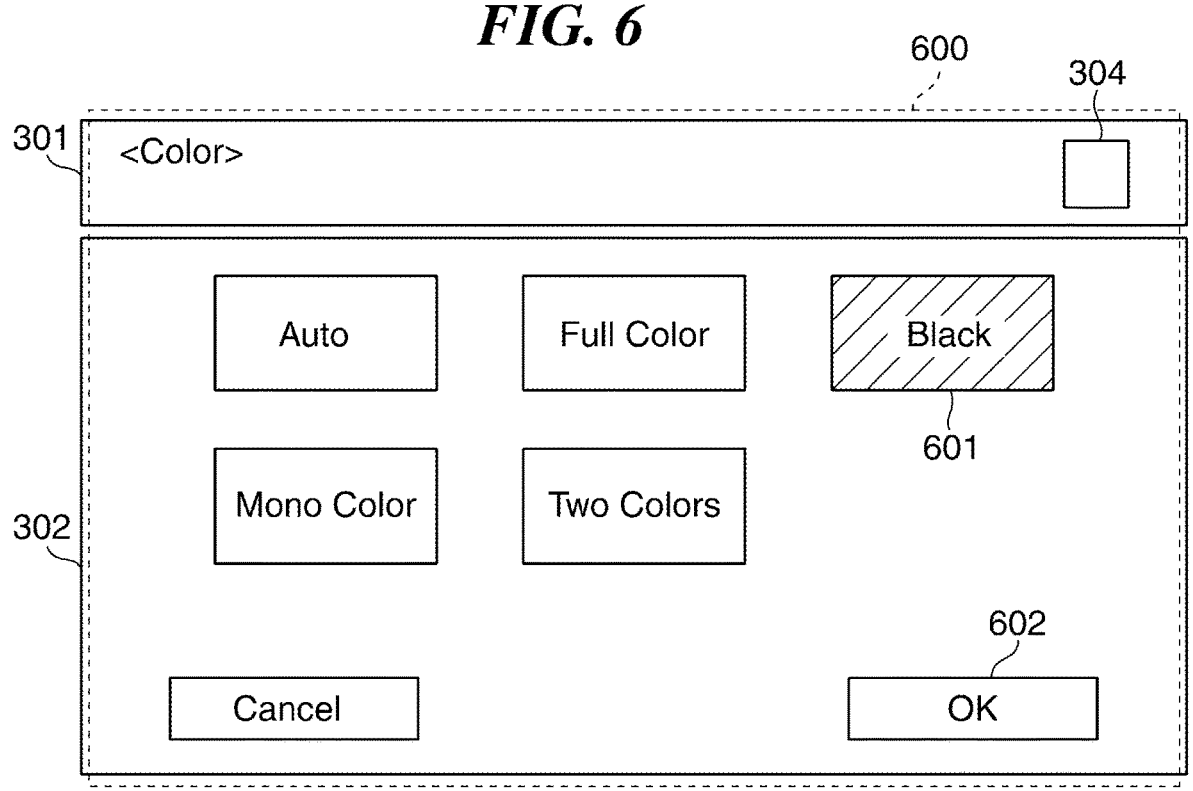
FIG. 6 is a view showing an example of a color setting screen displayed in relation to the portal button registration process in FIG. 5.

FIG. 5 is a flowchart of an example of a portal button registration process. In FIG. 5, the process executed by the copy application 2303 is illustrated at the left side and the process executed by the portal application 2307 is illustrated at the right side in order to distinguish the processes executed by the respective application clearly. The process of the flowchart in FIG. 5 is achieved when the CPU 101 reads a program stored in the ROM 103 to the RAM 102 and runs it. FIG. 5 describes a case where a function of which the color setting is changed to "monochrome" in the copy application 2303 is registered as the portal button 315. In the process in FIG. 5, the CPU 101 corresponds to the registration unit in the present invention.

First, when detecting the pressing of the copy application button 309 by a user on the top screen 300 shown in FIG. 3, the copy application 2303 switch the screen from the top screen 300 to the copy initial screen 400 (FIG. 4). Then, the copy application 2303 detects various settings about the image formation (copy) by the user on the copy initial screen 400, and stores the detected settings in the HDD 104 as the setting information (step S501).

Screen transition in response to concrete operations by the user for various settings about the image formation will be described with reference to FIG. 6 through FIG. 11. FIG. 6 through FIG. 11 are views showing examples of the screen displayed on the operation unit 112 in relation to the portal button registration process. When the color setting button 402 is pressed on the copy initial screen 400, the copy application 2303 switches the screen to a color setting screen 600 shown in FIG. 6. When a monochrome button 601 is pressed on the color setting screen 600, the copy application 2303 reverses the color of the monochrome button. When an OK button 602 is pressed in this state, the copy application 2303 stores the set color (monochrome in this case) in the HDD 104 and restores the screen to the previous screen (copy initial screen 400 in this case).

Next, a process for registering the set contents as a portal button will be described. First, when detecting pressing of the menu button 304 (FIG. 4), the copy application 2303 executes a registration command as a portal in step S502. That is, the copy application 2303 displays the menu list 700 over the copy initial screen 400, as shown in FIG. 7. Then, when detecting the pressing of the registration area 701 in the menu list 700, the copy application 2303 shifts to a portal-button registration mode.

When going into the portal-button registration mode, the copy application 2303 displays a confirmation screen 800 as a dialog on the copy initial screen 400 (step S503) as shown in FIG. 8 and waits for the input of the content confirmation from the user (step S504). A cancel button 801 and a next button 802 are displayed besides the contents (a color setting, a type of an original, etc.) set up by the user in the confirmation screen 800. The copy application 2303 determines whether the contents have been confirmed (OK) on the basis of whether the next button 802 has been pressed. Then, the copy application 2303 returns the process to the step S502 when the contents have not been confirmed. When the contents have been confirmed, the copy application 2303 sends a registration request to the portal application 2307 (step S505). That is, the copy application 2303 obtains the application ID of the copy application 2303 and the icon information for displaying as a portal button from the HDD 104 and sends them to the portal application 2307. It should be noted that the information about the settings like the color setting etc. is not sent.

Specifically, the copy application 2303 obtains the application ID and the icon information from the storage area, which includes the common data section 2302 and copy data section 2304, for the copy application 2303 set up in the HDD 104. Then, the window controller 2301 is notified of these pieces of information. Then, the window controller 2301 notifies the portal application 2307 of these pieces of information. The portal application 2307 stores the received information in the storage area, which includes the common data section 2302 and portal data section 2308, for the portal application 2307. When receiving the registration request from the copy application 2303, the portal application 2307 displays an action setting screen 900 on the operation unit 112 as shown in FIG. 9 and registers action information (an action pattern) of the portal button set by the user through the screen 900 (step S506). Soft buttons 901, 902, 903, and 904, a back button 905, and a next button 906 are displayed on the action setting screen 900. The soft buttons 901 through 904 are used for designating whether the contents of the setting information should be displayed as a UI screen to confirm before executing the process (function corresponding to the portal button) concerning the setting information set up for the portal button. The soft buttons 901 and 902 are respectively used to turn ON and OFF the setting confirmation display function. When the setting confirmation display function is turned ON, a setting confirmation screen 1600 (FIG. 16) is displayed in a button call process (FIG. 15) mentioned later. The soft buttons 903 and 904 are respectively used to set an immediate execution function that designates whether the function process concerning the setting information corresponding to the portal button is immediately executed or not. When the immediate execution function is set to ON by pressing the soft button 903, the function process is started without displaying a setting screen (FIG. 17) in a button call process (FIG. 15) mentioned later. In the meantime, when the immediate execution function is set to OFF by pressing the soft button 904, the setting screen (FIG. 17) is displayed in the button call process (FIG. 15) and the function process is started after receiving a start operation from a user.

Next, the portal application 2307 determines whether the registration became OK by pressing the next button 906 on the action setting screen 900 (step S507). Then, the portal application 2307 returns the process to the step S502 when the registration does not become OK. In the meantime, when the registration becomes OK, the portal application 2307 executes portal-button display setting (step S508). That is, the portal application 2307 displays a button-display setting screen 1000 shown in FIG. 10. Soft buttons each of which selects and inputs a button-display position are displayed on the button-display setting screen 1000. When a user presses a next button 1001 after selecting the display position by pressing one of the soft buttons in the button-display setting screen 1000, the portal application 2307 displays a button-display setting screen 1100 shown in FIG. 11. An input box for inputting a button display name is displayed on the button-display setting screen 1100. When the portal application 2307 detects the pressing of a next button 1101 that means completion of the setting after a user inputs a name of the button and inputs a comment if needed in the button display setting screen 1100, the process proceeds to step S509. In the step S509, the portal application 2307 executes a portal-button generation process on the basis of the contents input and set up through the action setting screen 900 and the button-display setting screens 1000 and 1100.

In order to generate the portal button, the portal application 2307 first generates an action ID by which the current registration request is uniquely identified in combination with the application ID. In the first embodiment, a consecutive number from "1" shall be assigned to the action ID for each application. Next, the portal application 2307 generates the portal button on the basis of the application ID, action ID, icon information, and button information. Specifically, the portal application 2307 update the table information by overwriting the table information shown in FIG. 13 with table information in FIG. 12 through the above-mentioned registration process in the storage area for the portal application 2307 in the HDD 104. In the table information shown in FIG. 12, the application ID of the copy application 2303, the action ID, the icon information, and the button information are associated and newly stored as one portal button. Thereby, the post-update table information (FIG. 12) includes a portal button No. 6 that is added to the pre-update table information (FIG. 13) by the above-mentioned registration process. The portal button 315 shall correspond to the portal button No. 6. When the process in FIG. 5 is executed in the state where the portal button 315 is unregistered, the portal button 315 corresponding to the portal button No. 6 is additionally displayed on the top screen 300 (FIG. 3) after that.

When the portal button has been generated, the portal application 2307 sends the generated action ID together with the completion notice to the copy application 2303 (step S510). The copy application 2303 associates the received action ID (call information) with the contents (setting information) set up in the step S501 and saves it to the storage area for the copy application 2303 in the HDD 104 (step S511). Thereby, the portal-button registration mode is finished.

An example of the set-information table associated with the action ID saved in the storage area for the copy application 2303 in the HDD 104 is shown in FIG. 14. In this set-information table, the icon information, setting information, and action information are associated with the action ID. The action information (i.e., the settings of the setting confirmation display function and immediate execution (immediate start) function) corresponds to an "action pattern" associated with a function. When the copy application 2303 always uses the same icon, it is not necessary to save the action ID in association with the icon information.

According to the process in FIG. 5, the data about the copy application 2303 registered to the portal button is held only by the copy application 2303, and the portal application 2307 holds the action ID only. Since a corresponding application is merely notified of an execution command when a content registered through the portal application 2307 is executed, a content can be registered to a portal button by the same procedure even if an application manages data in any data format. Although the process of the copy application 2303 is described as an example of an application in the first embodiment, registration to a portal button is allowed similarly about another application, such as the facsimile application.

Figure 15:
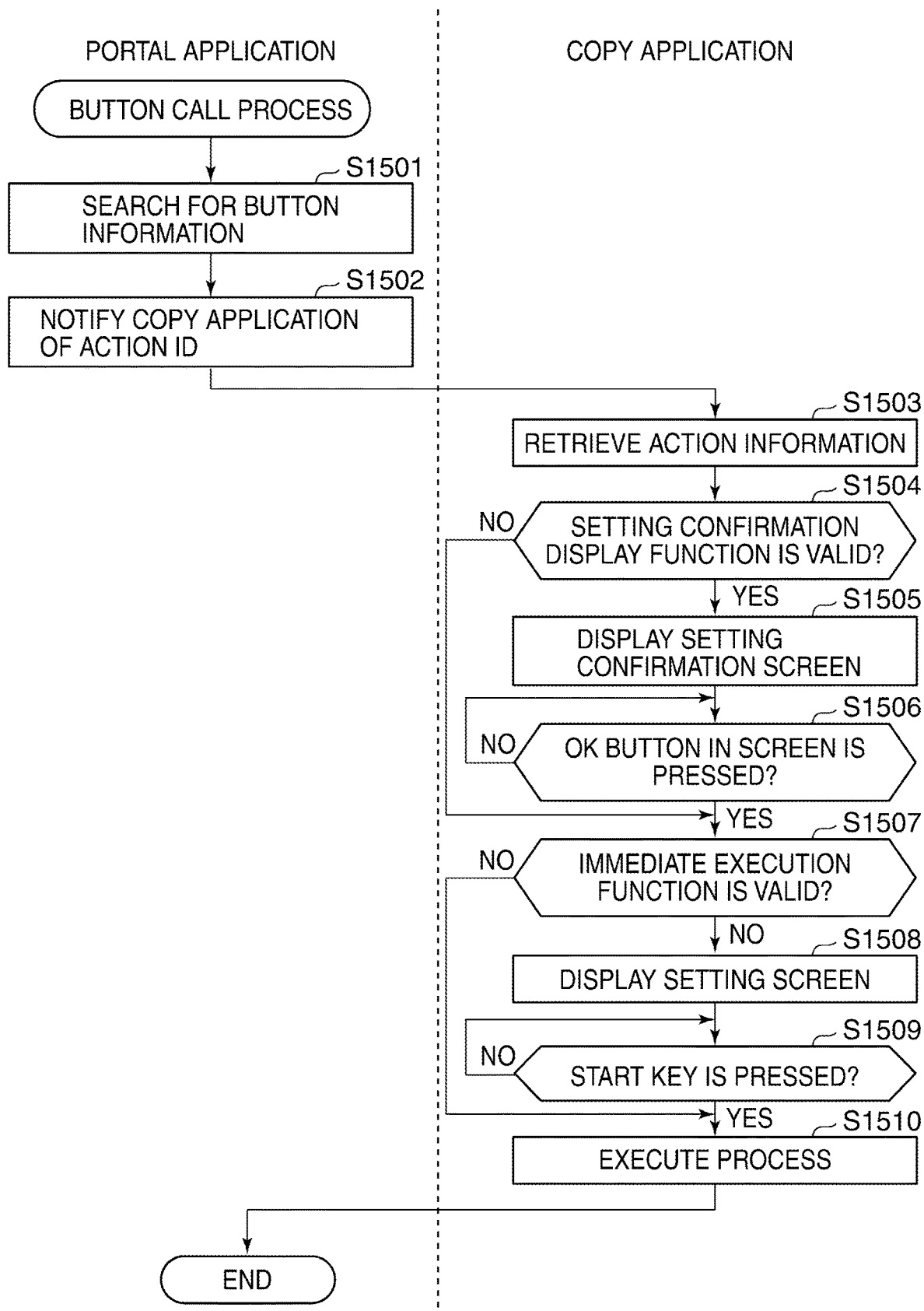
FIG. 15 is a flowchart of a button call process executed by the image processing apparatus in FIG. 1.
Figure 16:
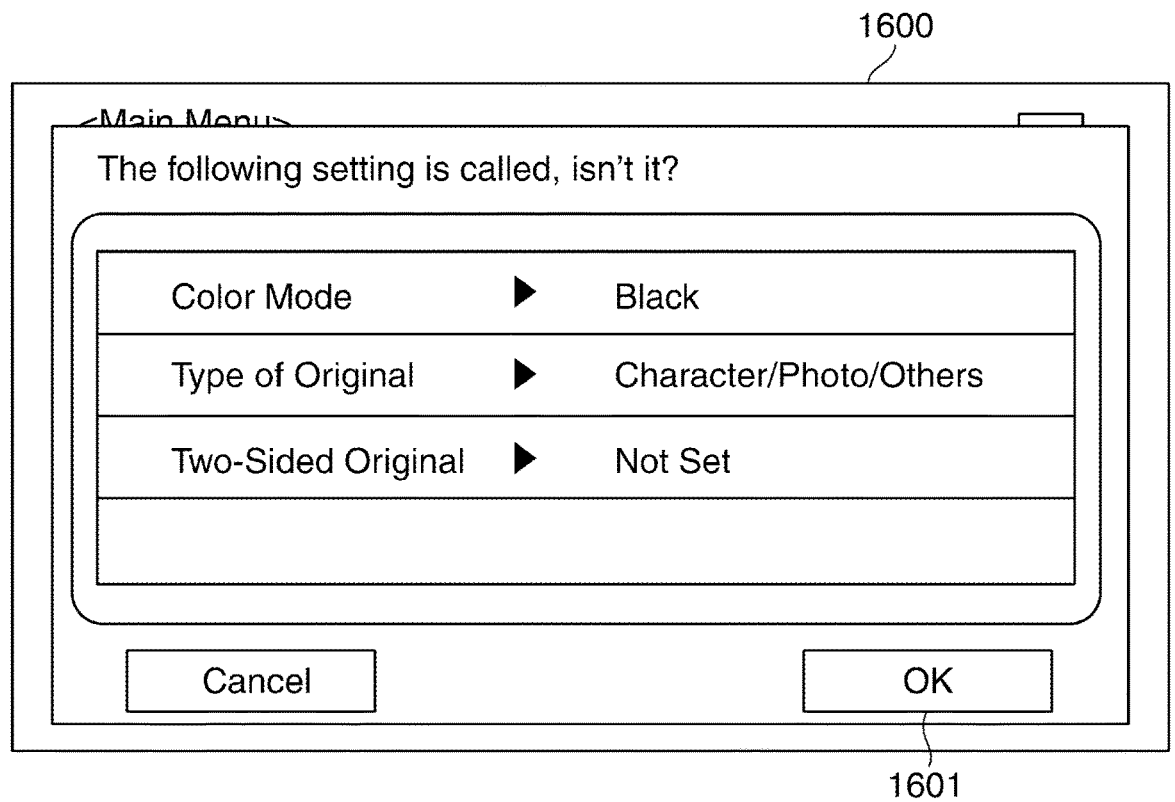
FIG. 16 is a view showing an example of a setting confirmation screen displayed in relation to the button call process in FIG. 15.
Figure 17:
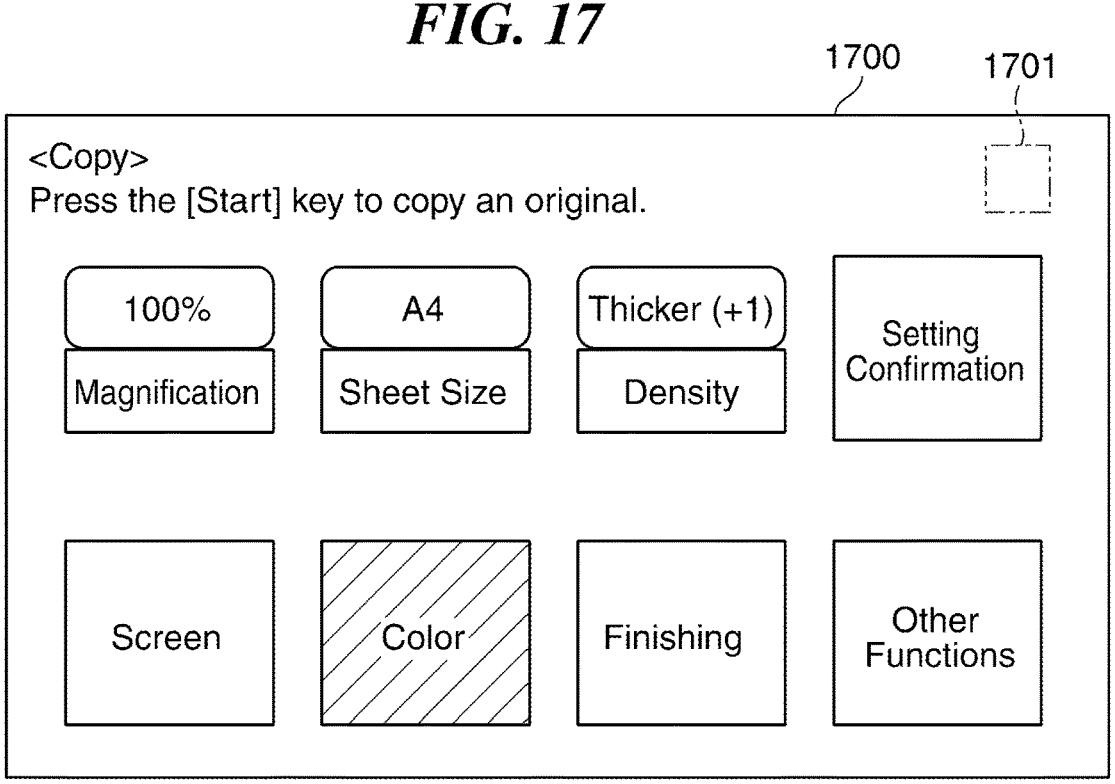
FIG. 17 is a view showing an example of a copy basic screen displayed in relation to the button call process in FIG. 15.

Next, the call reappearance function executed when a portal button currently displayed on the top screen 300 is pressed will be described. FIG. 15 is a flowchart of the button call process. The process of the flowchart is achieved when the CPU 101 reads a program stored in the ROM 103 to the RAM 102 and runs it. FIG. 15 shows an example where a press operation (first operation) is given to the portal button 315 corresponding to the portal button No. 6 on the top screen 300 shown in FIG. 3. In FIG. 15, the process executed by the called copy application 2303 is illustrated at the right side and the process executed by the portal application 2307 is illustrated at the left side. FIG. 16 and FIG. 17 are views showing examples of the screen displayed on the operation unit 112 in relation to the button call process.

When detecting pressing of the portal button 315 on the top screen 300, the portal application 2307 first searches the table information shown in FIG. 12 stored in the HDD 104 for the information corresponding to the pressed portal button (step S1501). Next, the portal application 2307 obtains the application ID and action ID corresponding to the portal button 315 from the table information (FIG. 12) and notifies the copy application 2303 of the obtained application ID and action ID (step S1502). In this example, the portal application 2307 obtains the application ID of "100" and the action ID of "3" that correspond to the portal button No. 6 and notifies.

The copy application 2303 retrieves the action information corresponding to the received action ID from the set-information table shown in FIG. 14 stored in the HDD 104 (step S1503). Next, the copy application 2303 determines whether the setting confirmation display function included in the retrieved action information is set to ON (i.e., is valid (true)) (step S1504). Then, when the setting confirmation display function is valid, the copy application 2303 pops up and displays the setting confirmation screen 1600 concerning the copy application 2303 over the top screen 300 as shown in FIG. 16 (step S1505). The application specific setting values included in the retrieved information are displayed on the setting confirmation screen 1600. After that, the copy application 2303 proceeds with the process to step S1506. In the meantime, when the setting confirmation display function is set to OFF (i.e., is invalid), the copy application 2303 proceeds with the process to step S1507 without displaying the setting confirmation screen 1600.

In the step S1506, the copy application 2303 waits until an OK button 1601 displayed on the setting confirmation screen 1600 is pressed. Then, when the OK button 1601 is pressed, the copy application 2303 determines whether the immediate execution function included in the retrieved action information is set to ON (i.e., is valid (true)) (the step 1507). Then, when the immediate execution function is valid, the copy application 2303 executes the function process corresponding to the setting information in association with the received action ID (step S1510), and finishes the button call process in FIG. 15. In the meantime, when the immediate execution function is invalid, the copy application 2303 displays a setting screen 1700 to which the setting information corresponding to the received action ID has been reflected, as shown in FIG. 17 (step S1508). Then, the copy application 2303 waits until a start key (not shown) is pressed (step S1509), and then executes a process in step S1510 when the start key is pressed. The process in this case is the process concerning the setting information set up in the step S1508. It should be noted that the start operation by a user is not limited to only the pressing of the start key, but also an operation or instruction that intends to the start operation may be employed.

As mentioned above, the process of the call reappearance function is executed on the basis of the setting information and the action information that has been registered through the action setting screen 900. That is, the function is executed according to the action pattern registered in association with the function designated by the portal button in response to the portal button call. Furthermore, a "temporary call function" is provided in the first embodiment. In the "temporary call function", the setting information registered to the portal button call can be changed on the basis of the action information that is selected temporarily at the time of the portal button call. That is, the application controls to execute the designated function in the action pattern corresponding to the user's designation irrespective of the action pattern registered.

Figure 18:
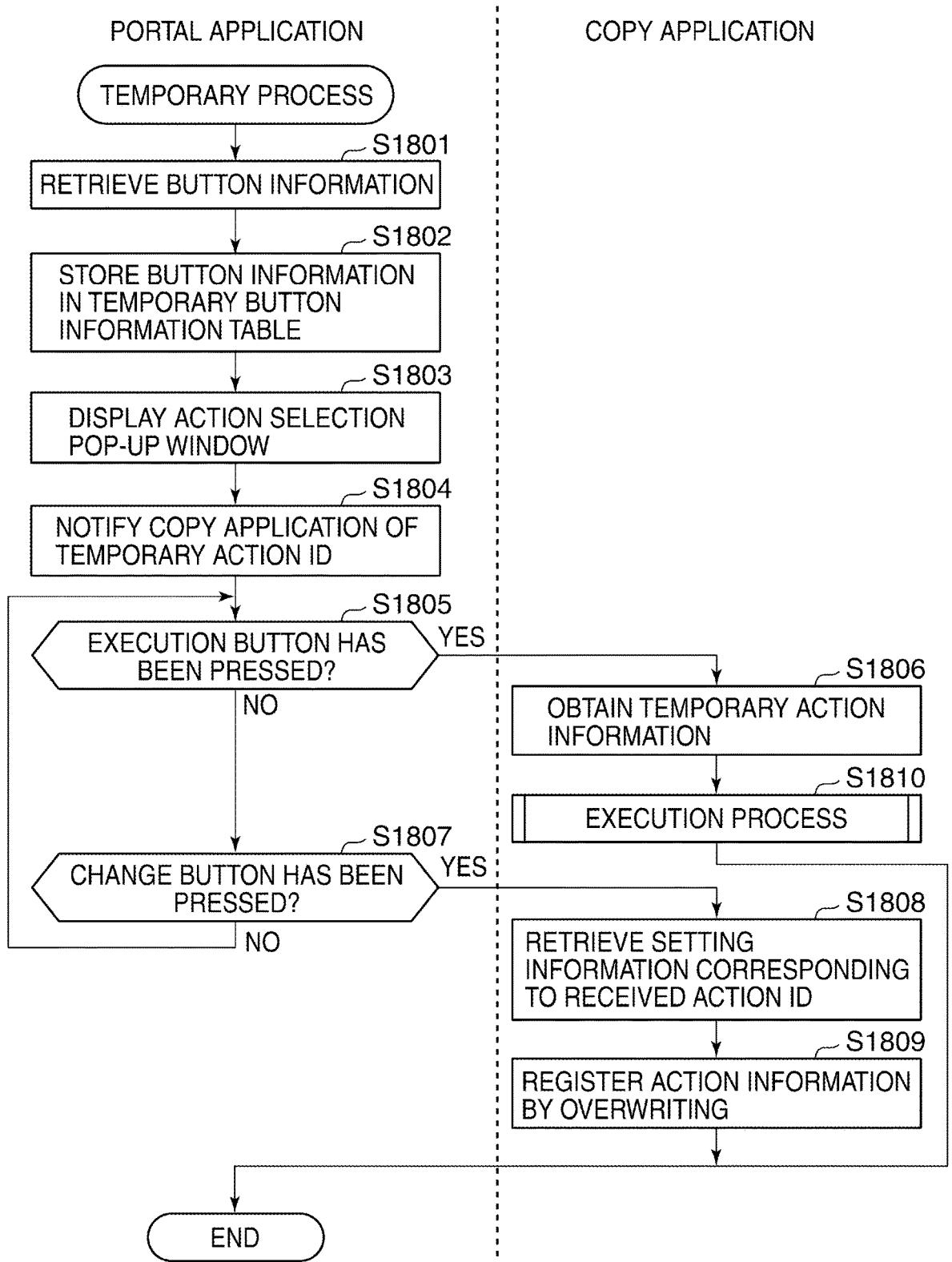
FIG. 18 is a flowchart of a temporary process executed by the image processing apparatus in FIG. 1.

FIG. 18 is a flowchart of a temporary process. The process of the flowchart is achieved when the CPU 101 reads a program stored in the ROM 103 to the RAM 102 and runs it. FIG. 18 shows an example of the process in a case where a second operation such as a long press is given to the portal button 315 corresponding to the portal button No. 6 on the top screen 300 shown in FIG. 3. The process executed by the called copy application 2303 is illustrated at the right side and the process executed by the portal application 2307 is illustrated at the left side.

Incidentally, there shall be at least two kinds of receivable operation patterns of a portal button on the top screen 300. The CPU 101 shall select a mode (first mode) of the button call process (FIG. 15) by a first operation pattern to a portal button by a user and shall select a mode (second mode) of the temporary process (FIG. 18) by a second operation pattern that is different from the first operation pattern. A function, such as a copy or a facsimile, of which desired settings are registered is designated by a pressed portal button on the top screen 300. Then, the button call process (first mode, FIG. 15) or the temporary process (second mode, FIG. 18) is selected according to the operation pattern. The first operation pattern shall be a simple press operation of a portal button. In the meantime, the second operation pattern is a long press operation or a continuous press operation of multiple times of a portal button. The long press operation shall be a press operation continued beyond a predetermined time period. The continuous press operation shall be press operations of multiple times (for example, 2 times) within a predetermined time period. It should be noted that these operation patterns are not limited to the above-mentioned example and are sufficient as long as the first operation pattern is clearly distinguished from the second operation pattern. In the processes in FIG. 15 and FIG. 18, the CPU 101 corresponds to the selection unit and the controller in the present invention.

Figure 19:
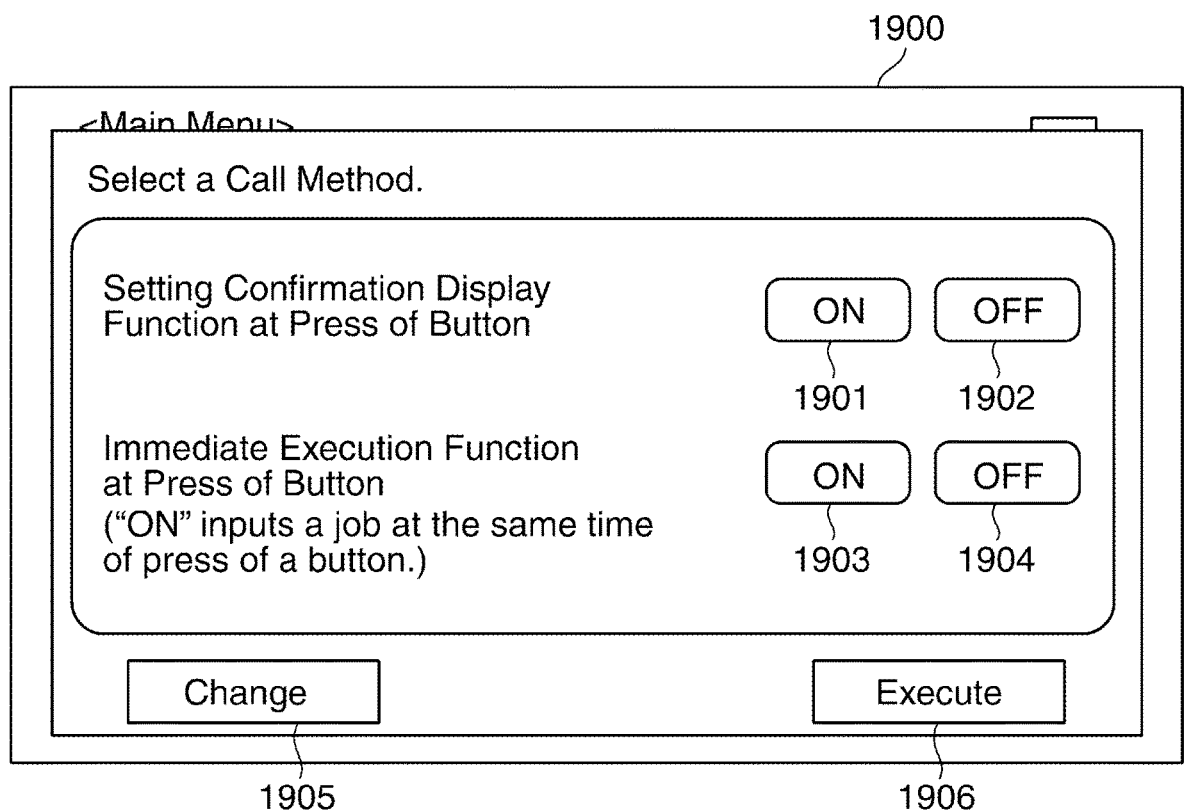
FIG. 19 is a view showing an example of an action selection pop-up window displayed on a touch panel of an operation unit of an image processing apparatus according to a second embodiment of the present invention.

FIG. 19 is a display example of an action selection pop-up window (a reception screen). FIG. 20A, FIG. 20B, and FIG. 20C are views showing examples of a temporary button information table.

When detecting an operation of the second operation to the portal button 315 on the top screen 300, the portal application 2307 first retrieves information corresponding to the operated portal button from among the table information shown in FIG. 12 that is stored in the HDD 104 (step S1801). Next, the portal application 2307 stores the retrieved information corresponding to the portal button 315 in the temporary button information table in the HDD 104 (step S1802). Thereby, the temporary button information table changes to a state shown in FIG. 20B from a blank state shown in FIG. 20A. That is, the portal button No. 6 and the information corresponding thereto are newly stored in the temporary button information table.

Next, the portal application 2307 displays an action selection pop-up window 1900 on the top screen 300, as shown in FIG. 19 (step S1803). Soft buttons 1901, 1902, 1903, and 1904, a change button 1905, and an execution button 1906 are displayed on this action selection pop-up window 1900. The soft buttons 1901 through 1904 are used for temporarily designating whether the contents of the setting information should be displayed as a UI screen to confirm before executing the process (function corresponding to the portal button) concerning the setting information set up for the portal button. First, the soft buttons 1901 and 1902 are respectively used to temporarily turn ON and OFF the setting confirmation display function, and correspond to the soft buttons 901 and 902 (FIG. 9), respectively. The soft buttons 1903 and 1904 are respectively used to temporarily set the immediate execution function that designates whether the function process concerning the setting information corresponding to the portal button is immediately executed or not. The soft buttons 1903 and 1904 correspond to the soft buttons 903 and 904 (FIG. 9). The settings of the action information designated by the soft buttons 1901 through 1904 is written in the temporary button information table in the HDD 104. For example, when the soft buttons 1901 and 1903 are selected, the temporary button information table changes to a state (the setting confirmation display function is ON and the immediate execution function is ON) shown in FIG. 20C from the state shown in FIG. 20B.

Then, the portal application 2307 retrieves the application ID and action ID that have been written at this time, and notifies the copy application 2303 of the application ID and action ID retrieved (step S1804). In this example, the portal application 2307 obtains the application ID of "100" and the action ID of "3" corresponding to the portal button No. 6 and notifies of them.

Next, the portal application 2307 determines whether the execution button 1906 on the action selection pop-up window 1900 has been pressed (step S1805). Then, when the execution button 1906 has not been pressed, the portal application 2307 determines whether the change button 1905 on the action selection pop-up window 1900 has been pressed (step S1807). Then, when the change button 1905 has not been pressed, the portal application 2307 returns the process to the step S1805. When the execution button 1906 has been pressed, the portal application 2307 proceeds with the process to step S1806. This means that the copy application 2303 received a process execution instruction according to the setting of the temporary action pattern.

The copy application 2303 retrieves action information from the temporary button information table shown in FIG. 20C in the HDD 104 and obtains the action information showing that the setting confirmation display function is ON and that the immediate execution function is ON (step S1806). The copy application 2303 executes the process in steps S1504 through S1510 in FIG. 15 on the basis of the obtained action information (step S1810). It should be noted that the copy application 2303 obtains the setting information that is a premise of the process executed at the time from the set-information table shown in FIG. 14 on the basis of the action ID received in the step S1804. Thereby, the function is executed in the action pattern corresponding to the designation from the user irrespective of the registered action pattern.

In the meantime, when detecting the press of the change button 1905, the portal application 2307 proceeds with the process to step S1808. This means that the copy application 2303 received an instruction of the change process. In the steps S1808 and S1809, the copy application 2303 executes the process that changes (updates) the action setting by overwriting the action setting at the time of registering the portal button with the action setting selected on the action selection pop-up window 1900. First, the copy application 2303 retrieves the setting information and action information corresponding to the received action ID from the set-information table (FIG. 14) saved in the storage area for the copy application 2303 in the HDD 104 (step S1808).

Next, the copy application 2303 obtains the retrieved action information from the temporary button information table shown in FIG. 20C and updates and registers the set-information table shown in FIG. 14 by overwriting with the obtained action information (step S1809). In this example, the contents of the action information corresponding to the portal button No. 6 (corresponding to the action ID "3") among the set-information table shown in FIG. 14 are changed so that the setting confirmation display function is ON and the immediate execution function is ON. Thereby, when the user designates to change the action pattern in the temporary process, the registered contents about the action pattern corresponding to the designated function are updated according to the change designation. After executing the process in the step S1810 or S1809, the process in FIG. 18 is finished.

Mainly according to the process in FIG. 5, the CPU 101 stores the setting information set up through the operation unit 112 in association with the action ID for calling it in the HDD 104 and stores the action ID in association with the corresponding button information in the HDD 104. Moreover, mainly according to the process in FIG. 15, the CPU 101 displays the button information as the portal button that is selectable by the user on the operation unit 112. When the user selects a desired portal button by an operation of the first operation pattern, the CPU 101 retrieves the action ID corresponding to the portal button from the HDD 104. Furthermore, the CPU 101 obtains the setting information and action information corresponding to the action ID concerned from the HDD 104 and executes or reflects the setting information on the basis of the obtained action information. Thereby, a simple operation becomes available.

Moreover, mainly according to the process in FIG. 18, when the user selects a desired portal button by an operation of the second operation pattern and designates execution after selecting the action pattern in the temporary process, the CPU 101 executes the process according to the action pattern selected in the temporary process. Thereby, a function is executed according to an action pattern corresponding to a changeable user's request. Furthermore, when the user selects a desired portal button by an operation of the second operation pattern and designates change after selecting the action pattern in the temporary process, the CPU 101 stores the action pattern selected in the temporary process and replaces the action information selected at the time of registration. Thereby, an action pattern of a function is able to be changed according to a changeable user's request.

According to the first embodiment, the CPU 101 registers a function in association with an action pattern. On the top screen 300 (FIG. 3), the CPU 101 designates a registered function in response to an operation of a portal button and selects the first mode or the second mode according to an operation pattern. Then, when the first mode is selected, the CPU 101 executes the function according to the action pattern registered corresponding to the designated function. Accordingly, it is convenient for a user who does not need the confirmation because of habituation due to repeated use of the function. In the meantime, when the second mode is selected, the CPU 101 controls so as to execute the designated function according to the action pattern that is designated by the user on the action selection pop-up window 1900 (FIG. 19) irrespective of the action pattern registered corresponding to the designated function. Accordingly, it is convenient for a user who used without confirmation but needs to confirm the setting values again when using after a long time. Accordingly, a simple operation is allowed and a function is able to be executed in an action pattern corresponding to a changeable user's request. This enables a careful description about a setting procedure for a user who is unfamiliar to functions and enables to select to display a description screen or to skip displaying by an easy operation according to a user's request.

Moreover, when the second mode is selected and when a change designation is given by the user to change an action pattern on the action selection pop-up window 1900 (FIG. 19), the registered content about the action pattern corresponding to the designated function is updated according to the change designation by overwriting (S1809). Since this enables to update the registered content of the function when calling and executing the function, convenience increases.

Next, a second embodiment of the present invention will be described. In the first embodiment, the buttons for switching ON/OFF of the setting confirmation display function and immediate execution function are displayed on the action selection pop-up window (FIG. 19) displayed by the temporary call reappearance function. Against this, in the second embodiment of the present invention, buttons for editing and deleting a portal button are displayed. The second embodiment will be described with reference to FIG. 21 and FIG. 22 in place of FIG. 18 and FIG. 19.

Figure 21:
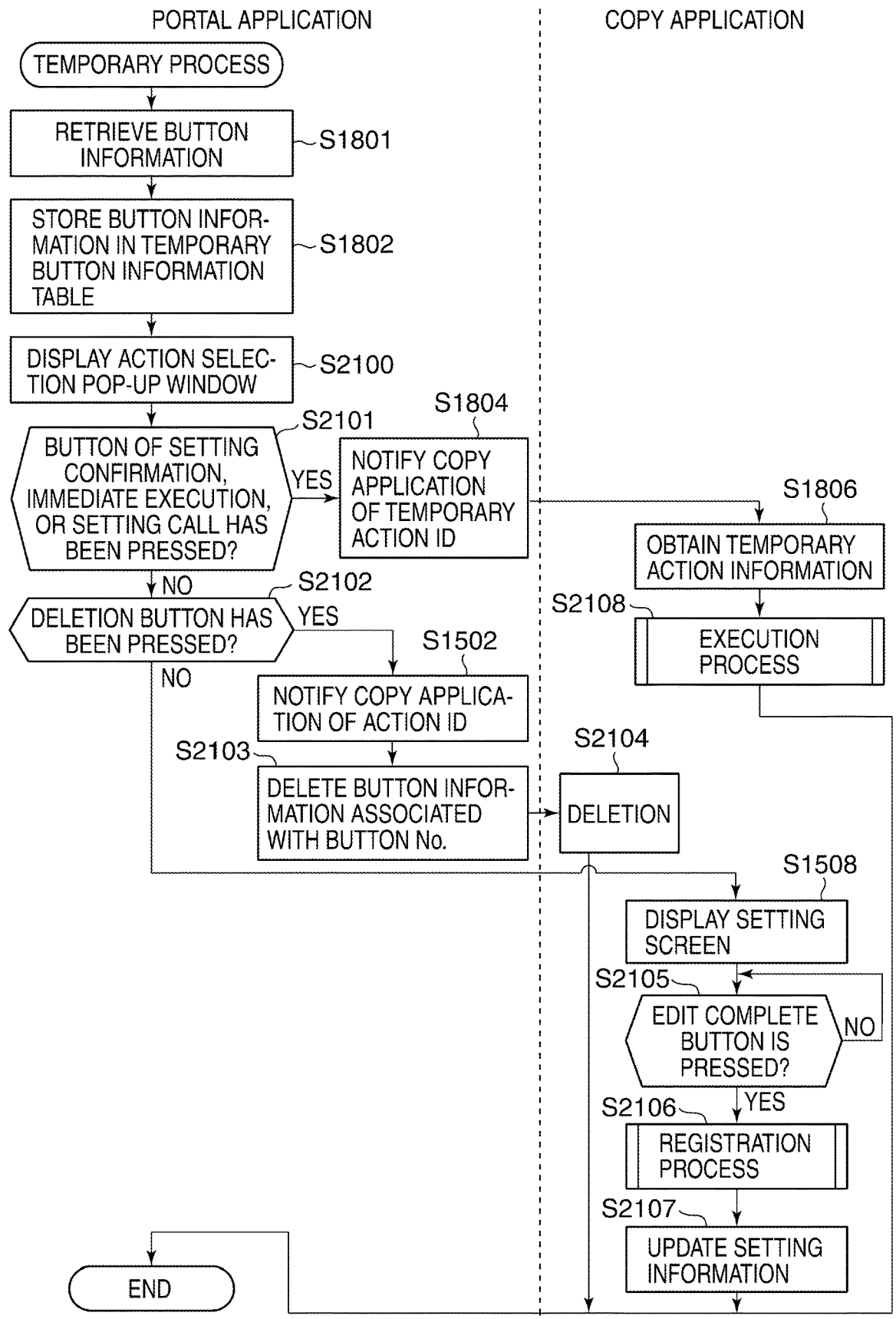
FIG. 21 is a flowchart of a temporary process executed by the image processing apparatus according to the second embodiment.

FIG. 21 is a flowchart of a temporary process. The process of the flowchart is achieved when the CPU 101 reads a program stored in the ROM 103 to the RAM 102 and runs it. FIG. 21 shows an example of the process in a case where a second operation such as a long press is given to the portal button 315 corresponding to the portal button No. 6 on the top screen 300 shown in FIG. 3. The process executed by the called copy application 2303 is illustrated at the right side and the process executed by the portal application 2307 is illustrated at the left side. In FIG. 21, the same step numbers are attached to the processing steps that are common to the steps in the flowcharts in FIG. 15 and FIG. 18.

Figure 22:
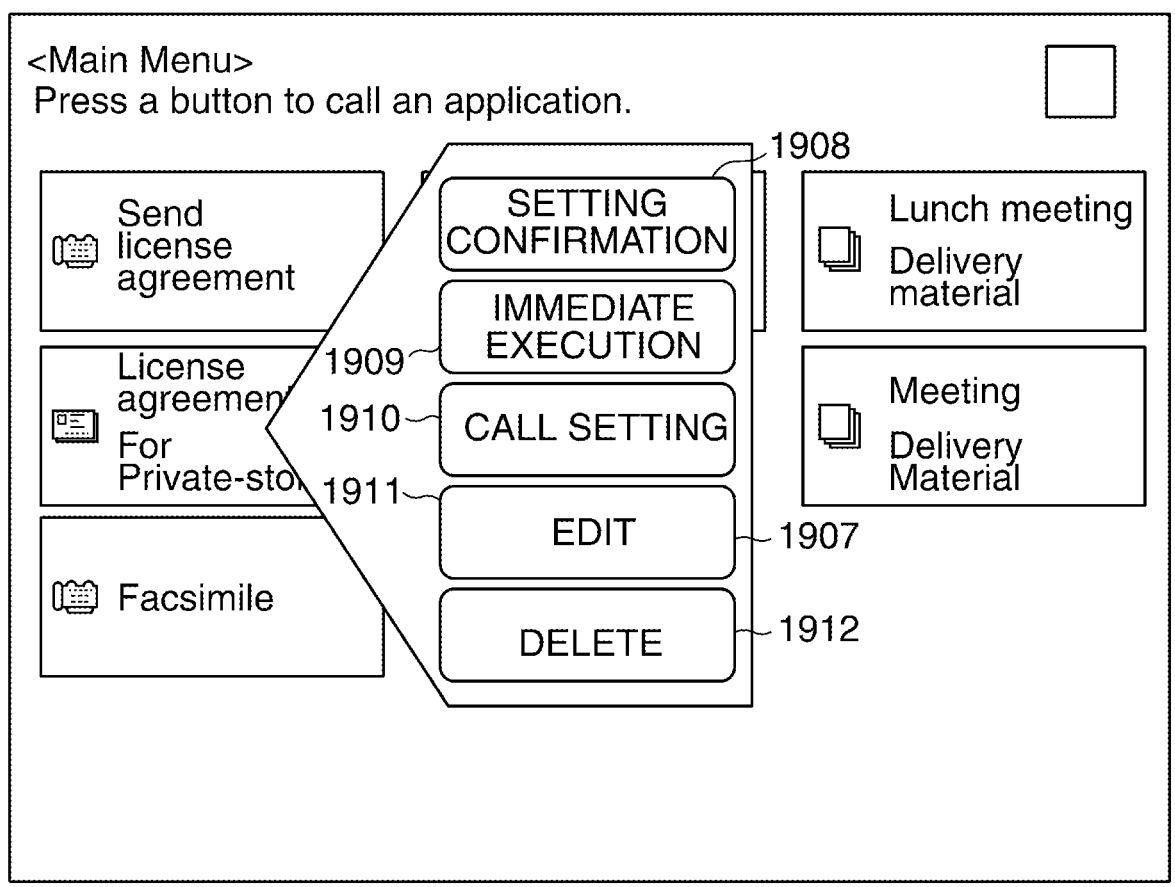
FIG. 22 is a view showing an example of the action selection pop-up window displayed on the touch panel of the operation unit of the image processing apparatus according to the second embodiment.

FIG. 22 is a display example of an action selection pop-up window. On the action selection pop-up window 1907, a setting confirmation button 1908, an immediate execution button 1909, a setting call button 1910, an edit button 1911, and a deletion button 1912 are displayed as soft buttons.

The processes in the steps S1801 and S1802 are identical to the corresponding steps in FIG. 18. In step S2100, the portal application 2307 displays the action selection pop-up window 1907 on the top screen 300, as shown in FIG. 22. Next, the portal application 2307 determines whether any one of soft buttons including the setting confirmation button 1908, immediate execution button 1909 and setting call button 1910 has been pressed (step S2101). Then, when any one of these soft buttons has been pressed, the portal application 2307 retrieves the application ID and action ID that have been written at this time, and notifies the copy application 2303 of the application ID and action ID retrieved (step S1804). The copy application 2303 retrieves action information from the temporary button information table shown in FIG. 20C in the HDD 104 and obtains the action information showing that the setting confirmation display function is ON and that the immediate execution function is ON (step S1806). The copy application 2303 executes the process on the basis of the soft button pressed in the step S2101 and the obtained action information (step S2108). It should be noted that the copy application 2303 obtains the setting information that is a premise of the process executed at the time from the set-information table shown in FIG. 14 on the basis of the action ID received in the step S1804.

Specifically, when the setting confirmation button 1908 is pressed, the copy application 2303 executes a process that is similar to a process executed in the case where the setting confirmation display function is ON and the immediate execution function is OFF. Accordingly, the copy application 2303 displays the setting screen 1700 (FIG. 17) when the OK button 1601 is pressed on the setting confirmation screen 1600 (FIG. 16) and then, executes the process when the start key of the operation unit 112 is pressed. Moreover, when the immediate execution button 1909 is pressed, the copy application 2303 executes a process that is similar to a process executed in the case where the setting confirmation display function is OFF and the immediate execution function is ON. Accordingly, the copy application 2303 executes the process without displaying the setting confirmation screen 1600 (FIG. 16) and the setting screen 1700 (FIG. 17). Moreover, when the setting call button 1910 is pressed, the copy application 2303 executes a process that is similar to a process executed in the case where the setting confirmation display function is OFF and the immediate execution function is OFF. Accordingly, the copy application 2303 displays the setting screen 1700 (FIG. 17) without displaying the setting confirmation screen 1600 (FIG. 16) and executes the process when the start key of the operation unit 112 is pressed. Then, the process in FIG. 21 finishes.

As a result of the determination in the step S2101, when any one of the setting confirmation button 1908, immediate execution button 1909, and setting call button 1910 has not been pressed, the portal application 2307 determines whether the deletion button 1912 has been pressed (step S2102). Then, when the deletion button 1912 is pressed, the portal application 2307 executes the process in the step S1502 in the similar manner described with reference to FIG. 15. Next, the portal application 2307 deletes the information (the button No., application ID, action ID, icon information, and button information) about the portal button 315 from the table information shown in FIG. 12 (step S2103). Next, the copy application 2303 deletes the information corresponding to the action ID received through the step S1502 from the set-information table shown in FIG. 14 (step S2104). Thereby, the registration of the function corresponding to the portal button 315 is deleted, and the portal button 315 is no longer displayed on the top screen 300 (FIG. 3) after that. Then, the process in FIG. 21 finishes.

As a result of the determination in the step S2102, when the deletion button 1912 has not been pressed, it means that the edit button 1911 has been pressed, the portal application 2307 proceeds with the process to the step S1508. In the step S1508, the copy application 2303 displays the setting screen 1700 (FIG. 17). In the second embodiment, an edition complete button 1701 is displayed in the setting screen 1700 shown in FIG. 17 unlike the first embodiment. A user is able to change (edit) the setting on the setting screen 1700. Then, the copy application 2303 wait until the edition complete button 1701 is pressed (step S2105), and proceeds with the process to step S2106 when the edition complete button 1701 is pressed. In the step S2106, a registration process equivalent to the steps S501 through S510 in FIG. 5 is executed. After that, the copy application 2303 updates the set-information table by overwriting the setting information in the set-information table shown in FIG. 14 with the setting after editing on the setting screen 1700 in step S2107. Thereby, the registered content about the setting information corresponding to the function is updated according to the user's editing instruction. Then, the process in FIG. 21 finishes.

As mentioned above, since the action patterns for editing and deleting the registered content of the portal button are available on the action selection pop-up window that is displayed at the time of calling the portal button in addition to the setting confirmation display function, immediate execution function and setting call function, the operability of the portal button is improved.

According to the second embodiment, a simple operation is allowed and a function is able to be executed in an action pattern corresponding to a changeable user's request as with the first embodiment. Moreover, when the second mode is selected and a deletion designation is given by the user to delete a function, the registration of the designated function is deleted from the set-information table shown in FIG. 14. Furthermore, when the second mode is selected and an edition designation is given by the user to edit the setting information, the registered content about the setting information corresponding to the designated function is updated according to the edition designation. These features improve the operability and convenience.

In the above-mentioned first and a second embodiments, when the setting confirmation display function is ON, the setting confirmation screen 1600 (FIG. 16) shall be displayed for designating whether the notification of the setting information is needed before executing the function. Moreover, the setting screen 1700 (FIG. 17) shall be displayed for notification of the setting information. However, the designation method about notification of the setting information and the notification method are not limited to the exemplified screen display, they may be achieved using voice.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-222894, filed Nov. 20, 2017, which is hereby incorporated by reference herein in its entirety.

What is claimed is:

1. An information processing apparatus comprising:
one or more processors connected to one or more memories, the one or more processors being configured to:
register setting information about image formation and display-setting information indicating whether to display a confirmation screen that allows a user to confirm the setting information about image formation before execution of print processing, while associating the setting information about image formation and the display-setting information with a button;
display the button on a display screen;
in a case where the button is selected through a short press operation by a user, execute the print processing based on the setting information about image formation associated with the button; and
in a case where the button is selected through a long press operation by a user,
display an action selection window near the button on the display screen and also display an edit button in the action selection window, and
in response to the edit button being selected, display a setting screen that allows a user to change the setting information about image formation.

2. The information processing apparatus according to claim 1, wherein the one or more processors is configured to: edit the button displayed on the display screen in accordance with selection of the edit button.

3. The information processing apparatus according to claim 1, wherein the long press operation is a touching operation on the displayed button continued beyond a predetermined time period.

4. A control method for an information processing apparatus, the control method comprising:
registering setting information about image formation and display-setting information indicating whether to display a confirmation screen that allows a user to confirm the setting information about image formation before execution of print processing, while associating the setting information about image formation and the display-setting information with a button;
displaying the button on a display screen;
in a case where the button is selected through a short press operation by a user, executing the print processing based on the setting information about image formation associated with the button; and
in a case where the button is selected through a long press operation by a user,
displaying an action selection window near the button on the display screen and also displaying an edit button in the action selection window, and
in response to the edit button being selected, displaying a setting screen that allows a user to change the setting information about image formation.

5. The control method according to claim 4, further comprising:
editing the button displayed on the display screen in accordance with selection of the edit button.

6. The control method according to claim 4, wherein the long press operation is a touching operation on the displayed button continued beyond a predetermined time period.

\* \* \* \* \*